(12) United States Patent
Brodess et al.

(10) Patent No.: US 8,241,186 B2
(45) Date of Patent: Aug. 14, 2012

(54) INTERACTIVE EXERCISE DEVICES

(75) Inventors: David Brodess, Austin, TX (US); Michael Casey, Austin, TX (US)

(73) Assignee: Fitness Brands 2, LLC, Austin, TX (US)

(*) Notice: Subject to any disclaimer, the term of this patent is extended or adjusted under 35 U.S.C. 154(b) by 0 days.

(21) Appl. No.: 12/873,680

(22) Filed: Sep. 1, 2010

(65) Prior Publication Data

US 2011/0275482 A1    Nov. 10, 2011

Related U.S. Application Data

(63) Continuation-in-part of application No. 12/775,964, filed on May 7, 2010, now Pat. No. 8,118,718.

(51) Int. Cl.
*A63B 21/00* (2006.01)

(52) U.S. Cl. ............... 482/52; 482/44; 482/45; 482/907

(58) Field of Classification Search ............ 482/44, 482/8, 46, 49, 139, 100, 97, 904; 434/40, 434/587, 595; 601/247, 258–260
See application file for complete search history.

(56) References Cited

U.S. PATENT DOCUMENTS

| | | |
|---|---|---|
| 1,984,165 A | 12/1934 | Tolchin |
| 4,989,860 A | 2/1991 | Iams et al. |
| 5,518,483 A | 5/1996 | Oswald |
| 5,595,554 A * | 1/1997 | Maresh .......................... 482/52 |
| 6,071,217 A | 6/2000 | Barnett |
| D439,291 S | 3/2001 | Barnett et al. |
| 6,613,000 B1 * | 9/2003 | Reinkensmeyer et al. ... 600/587 |
| 6,623,409 B1 | 9/2003 | Abelbeck |
| 6,985,133 B1 * | 1/2006 | Rodomista et al. ........... 345/156 |
| 7,837,599 B2 * | 11/2010 | Kowalczewski et al. ....... 482/44 |
| 2002/0094913 A1 * | 7/2002 | Valentino ........................ 482/45 |
| 2005/0124474 A1 | 6/2005 | Van Der Hoeven |
| 2005/0128186 A1 * | 6/2005 | Shahoian et al. ............. 345/161 |
| 2007/0232464 A1 | 10/2007 | Chu |
| 2007/0254786 A1 | 11/2007 | Owen |
| 2008/0070765 A1 | 3/2008 | Brown et al. |

* cited by examiner

*Primary Examiner* — Jerome W Donnelly
(74) *Attorney, Agent, or Firm* — TechLaw LLP

(57) ABSTRACT

An interactive exercise device includes a stationary base to which a first exercise implement is movably connected. A first resistance element is operably connected to the first exercise implement to provide resistance against at least some movements of the first exercise implement relative to the stationary base. An interactive motion guide that directs a user of the interactive exercise device to move the first exercise implement relative to the stationary base in an indicated manner is operably connected to the interactive exercise device. The interactive motion guide includes first and second electronic indicators to which a processor is operably connected. A non-transitory and tangible computer readable medium is operably connected to the processor and includes instructions to manipulate output of the first and second electronic indicators in response to movement of the first exercise implement relative to the stationary base.

11 Claims, 17 Drawing Sheets

INTERACTIVE EXERCISE DEVICES

CROSS-REFERENCE TO RELATED APPLICATIONS

This application is a continuation-in-part of, and claims priority to, currently pending U.S. patent application Ser. No. 12/775,964 filed May 7, 2010 and entitled "Abdominal Exercise Training Device," the contents of which are incorporated herein by reference as if set forth verbatim.

FIELD

The following description relates generally to exercise equipment, and more particularly to interactive exercise devices.

BACKGROUND

In recent years the rapid development of computer technology has outpaced the development of new types of exercise and fitness equipment. Although computers have been integrated into conventional fitness equipment in the past, this has mainly been in the form of programs and calorie counters for cardiovascular exercisers such as treadmills and elliptical machines. These existing computer-enhanced exercisers, however, do not permit significant user interactivity with the exercise machine wherein the machine actively responds to physical movements of the users. Particularly in light of the revolution in small mobile computers such as smartphones, there is a need for integrating electronic feedback into modern workout routines.

The combination of problems with known computer-enhanced exercise devices, such as repetitive exercises and lack of device interactivity (e.g., capability of the device to instruct the user on routines to perform and respond to user input and/or movements) can quickly lead to monotonous exercise routines that users quickly abandon out of boredom. Accordingly, there is a need for interactive exercise devices that allow users to safely perform exercises on a wide variety of equipment while receiving instructions/or feedback from an electronic exercise guide.

Additionally, fitness experts and athletes are becoming increasingly aware of the importance of a strong "core" to overall fitness and athletic ability. Among the most important core muscles are muscles in the stomach, chest and back, in particular the abdominal muscles. Abdominal and other core muscles can be exercised without the use of any exercise equipment, for example by doing abdominal crunches or sit-ups. However, performing these exercises poses risk of injury, especially to the lower back, if the person does not use proper technique and/or is not in good physical shape. It is therefore desirable to provide a piece of fitness equipment that allows people to exercise their core muscles safely using consistent form.

Many such devices are well known. For example, there are many devices used for performing abdominal crunches and sit-ups. Furthermore, devices for exercising core muscles using motions not possible without special equipment are known. For example, U.S. Pat. No. 6,071,217 to Barnett discloses a prone torso exerciser. However, these known devices lack functionality and features that would improve the user's exercise experience. For example, known devices generally only target one group of muscles or only allow the user to move through one or two rigidly defined ranges of motion.

Accordingly, there is also need for an interactive exercise device that allows users to safely perform exercises using proper form without being constrained by the device to a narrow range of motion.

SUMMARY

The following simplified summary of devices that satisfy this need is provided in order to give a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, an abdominal training device includes a stationary base with a user support surface and a hub connected to a track with a friction mitigation unit and a distal end with a track anchor. A console is slidably mounted on the track and includes a hand support member and a console anchor. A bearing is fixedly mounted to the proximal end of the track and supports an elastic resistance element with one end attached to the track anchor and the other end attached to the console anchor. A beam rigidly connects the track to the hub of the stationary base so that the track is at least partially rotatable about the hub of the stationary base. The device may also include an electronic training program that directs a user to rotate the track to specified positions. The device may be part of an abdominal training kit that also includes a rotation measurement device comprising a plurality of evenly spaced indicators disposed around the hub of the abdominal training device, the plurality of evenly spaced indicators defining an arc.

In some embodiments, the bearing mounted to the proximal end of the track is a pulley that rollably supports one or more elastic resistance elements, each of which has a first end anchored to the distal end of the track and a second end anchored to the console. In some embodiments the hand support member of the console is a pair of handlebars, and the friction mitigation unit of the track is a wheel. The track may have a range of rotation about the hub of the stationary base of at least 90 degrees. Furthermore, the abdominal training device may include a track position sensor that detects a current displacement of the track relative to a starting position. An alert system may indicate the current displacement of the track to a user, for example using lights that illuminate or extinguish, or a sound generator that emits sound, when the current displacement of the track exceeds a threshold displacement. The abdominal training device may also have a console position sensor that detects a current position of the console relative to the track.

In some embodiments, the console of the abdominal training device includes an embedded electronic training program that uses data received from a track position sensor to direct a user to rotate the track from a current position to a new position. The new position of the track may be indicated to the user by illumination of a light corresponding to the new position to which the user is required to rotate the track. Once the user successfully rotates the track to the new position, the light corresponding to the new position is extinguished, or the user is otherwise notified, for example by sound emissions from a sound generator.

In another aspect of the disclosed embodiments, an abdominal training kit includes an abdominal training device and a rotation measurement device. The abdominal training device includes a stationary base with a user support surface and a hub. A track with a friction mitigation unit is rotatably connected to the hub of the stationary base. A console with a hand support member is slidably mounted on the track. A beam rigidly connects the track to the hub of the stationary base, the beam having a first end attached to the proximal end of the track and a second end attached to the hub of the stationary base so that the track is at least partially rotatable about the hub of the stationary base. The rotation measurement device includes a plurality of evenly spaced indicators disposed around the hub of the abdominal training device so as to define an arc about the hub. The arc defined by the plurality of evenly spaced indicators may be at least 45 degrees. The rotation measurement device may be an arcuate mat having a plurality of evenly spaced indicia. Additionally or alternatively, the plurality of evenly spaced indicators may be a plurality of evenly spaced cones.

In another embodiment, an interactive exercise device includes a stationary base and a first exercise implement movably connected to the stationary base. A first resistance element is operably connected to the first exercise implement to provide resistance against at least some movements of the first exercise implement relative to the stationary base. An interactive motion guide that directs a user of the interactive exercise device to move the first exercise implement relative to the stationary base in an indicated manner is operably connected to the interactive exercise device. The interactive motion guide includes first and second electronic indicators and a processor operably connected to the first and second electronic indicators. A non-transitory and tangible computer readable medium is operably connected to the processor and includes instructions to manipulate output of the first and second electronic indicators in response to movement of the first exercise implement relative to the stationary base.

In one embodiment of an interactive exercise device, the first and second electronic indicators are lights and/or sound emitting devices such as speakers. In another embodiment, the interactive motion guide may include a display screen and the first and second electronic indicators are indicia displayed on the display screen.

The first resistance element may be an elastic member having a first end connected to the first exercise implement and a second end connected to the stationary base. The first resistance element may also be a weight or mass operably connected to the first exercise implement, including the user's own bodyweight.

The first exercise implement may be movable between a first position and a second position, and the interactive motion guide may include first and second position sensors operably connected to the processor that detect when the first exercise implement has reached the first and second positions respectively. The processor changes the output of the first electronic indicator when the first position sensor detects that the first exercise implement has reached the first position, and the processor changes the output of the second electronic indicator when the second position sensor detects that the first exercise implement has reached the second position.

In some embodiments, the stationary base includes a track and the first exercise implement includes a trolley that slides along on the track. The first and second positions of the first exercise implement sensed by the interactive motion guide may correspond to different first and second locations of the trolley along the track.

In other embodiments, the stationary base may include substantially vertical rails and the first exercise implement may be a barbell slidably mounted to the substantially vertical rails. The first and second positions of the first exercise implement sensed by the interactive motion guide may correspond to first and second locations of the barbell along the substantially vertical rails.

In still other embodiments, the stationary base may include an arcuate track and the first exercise implement may include a user support member rotatable along the arcuate track. The first and second positions of the first exercise implement sensed by the interactive motion guide may correspond to first and second locations of the user support member along the arcuate track. The user support member may include kneepads.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

In one aspect of the disclosed embodiments, an interactive exercise device includes a stationary base and a first exercise implement movably connected to the stationary base. A first resistance element is operably connected to the first exercise implement to provide resistance against at least some movements of the first exercise implement relative to the stationary base. An interactive motion guide that directs a user of the interactive exercise device to move the first exercise implement relative to the stationary base in an indicated manner is operably connected to the interactive exercise device. The interactive motion guide includes first and second electronic indicators and a processor operably connected to the first and second electronic indicators. A non-transitory and tangible computer readable medium is operably connected to the processor and includes instructions to manipulate output of the first and second electronic indicators in response to movement of the first exercise implement relative to the stationary base.

In another aspect of the disclosed embodiments, an abdominal training device includes a track that can be rotated around a hub of a stationary base. A console is slidably mounted on the track and includes a hand support member. A bearing mounted to the track supports an elastic resistance element with one end anchored to the track and the other end anchored to the console. Movement of the console along the track is resisted in one direction by the elastic resistance element. The device may also include an electronic training program that directs a user to rotate the track to specified positions. The device may be part of an abdominal training kit that also includes a rotation measurement system.

In another aspect of the disclosed embodiments, an abdominal training kit includes an abdominal training device and a rotation measurement device. The abdominal training device includes a stationary base with a user support surface and a hub. A track with a friction mitigation unit is rotatably connected to the hub of the stationary base. A console with a hand support member is slidably mounted on the track. A beam rigidly connects the track to the hub of the stationary base, the beam having a first end attached to the proximal end of the track and a second end attached to the hub of the stationary base so that the track is at least partially rotatable about the hub of the stationary base. The rotation measurement device includes a plurality of evenly spaced indicators disposed around the hub of the abdominal training device so as to define an arc about the hub. The arc defined by the plurality of evenly spaced indicators may be at least 45 degrees. The rotation measurement device may be an arcuate mat having a plurality of evenly spaced indicia. Additionally or alternatively, the plurality of evenly spaced indicators may be a plurality of evenly spaced cones.

Figure 1:
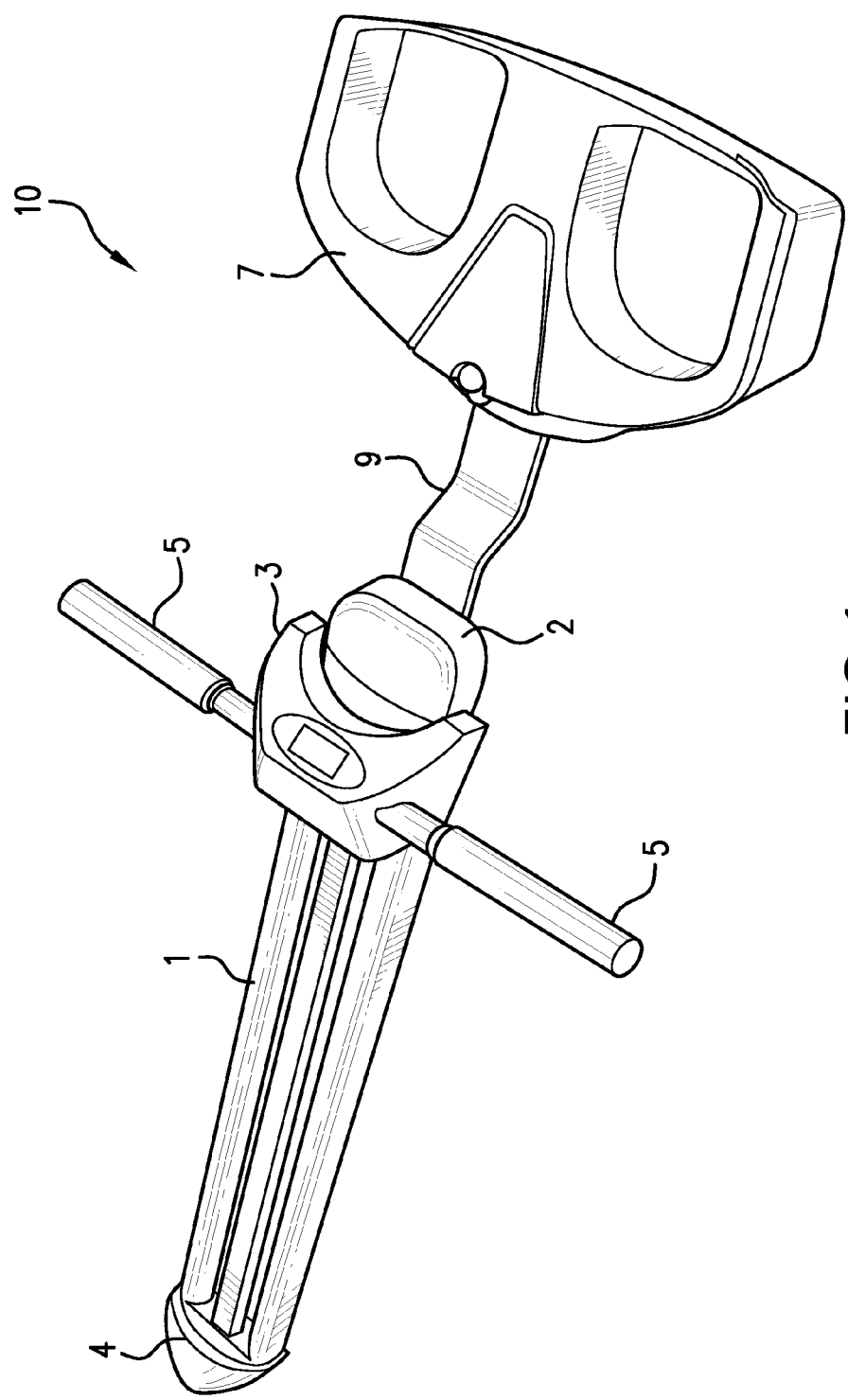
FIG. 1 is a perspective view of a first embodiment of an abdominal training device.
Figure 2:
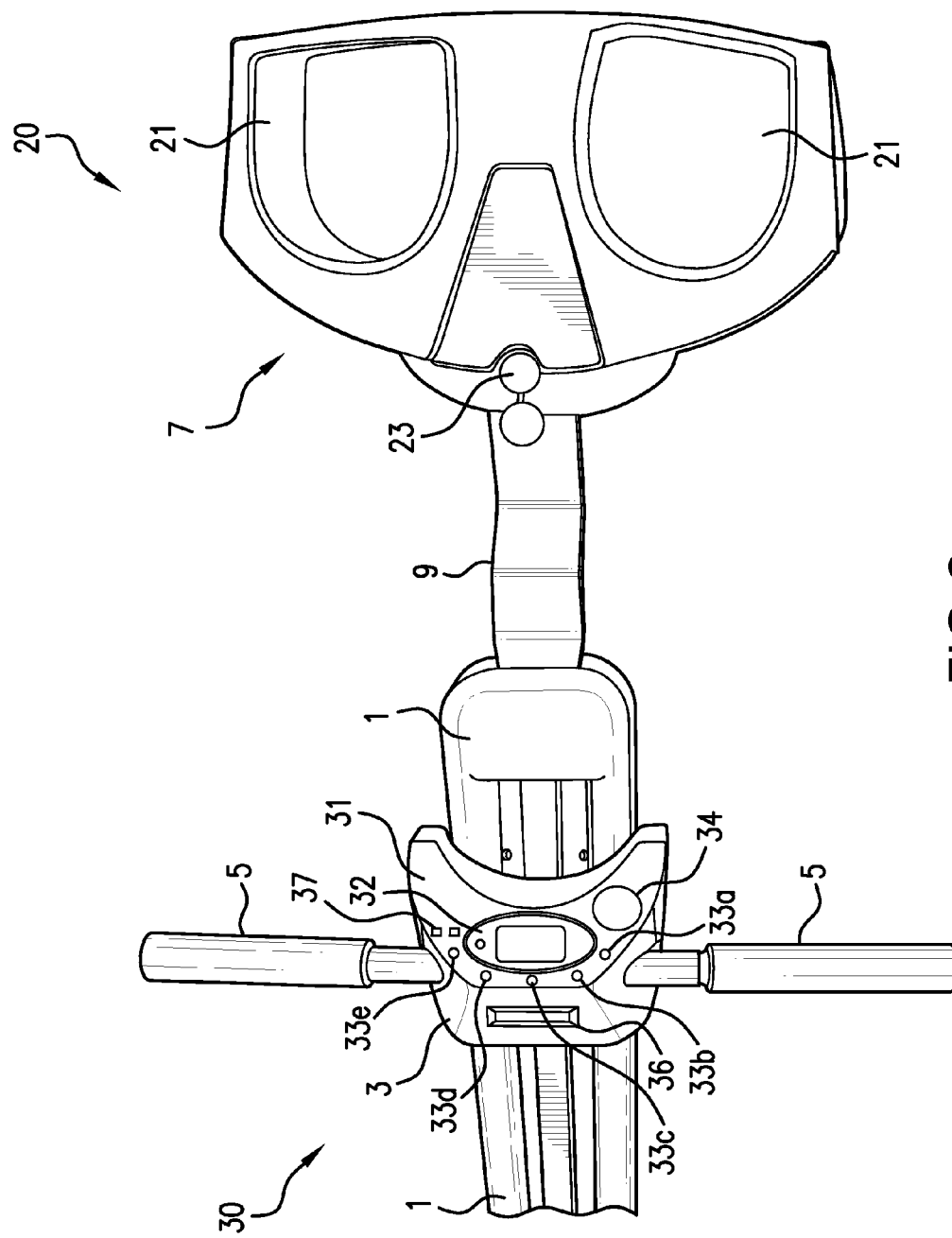
FIG. 2 is a partial top plan view of the embodiment of FIG. 1.

As seen in FIGS. 1 and 2, one embodiment of abdominal training device 10 includes track 1, console 3 and stationary base 7. Console 3 is slidably mounted on track 1 and includes hand support members 5 and user interface 31. User interface 31 may be on a removable panel that docks with console 3 so that user interface 31 is an optional feature. Track 1 includes proximal end 2 and distal end 4. Beam 9 rigidly connects proximal end 2 of track 1 to stationary base 7. The connection between beam 9 and stationary base 7 is a rotating connection (explained in further detail below) that allows track 1 to rotate in a horizontal plane at least partially around stationary base 7. Locking mechanism 23 may be engaged to prevent rotation of track 1. Stationary base 7 includes one or more user support surfaces 21 which may be formed as kneepads.

Figure 3:
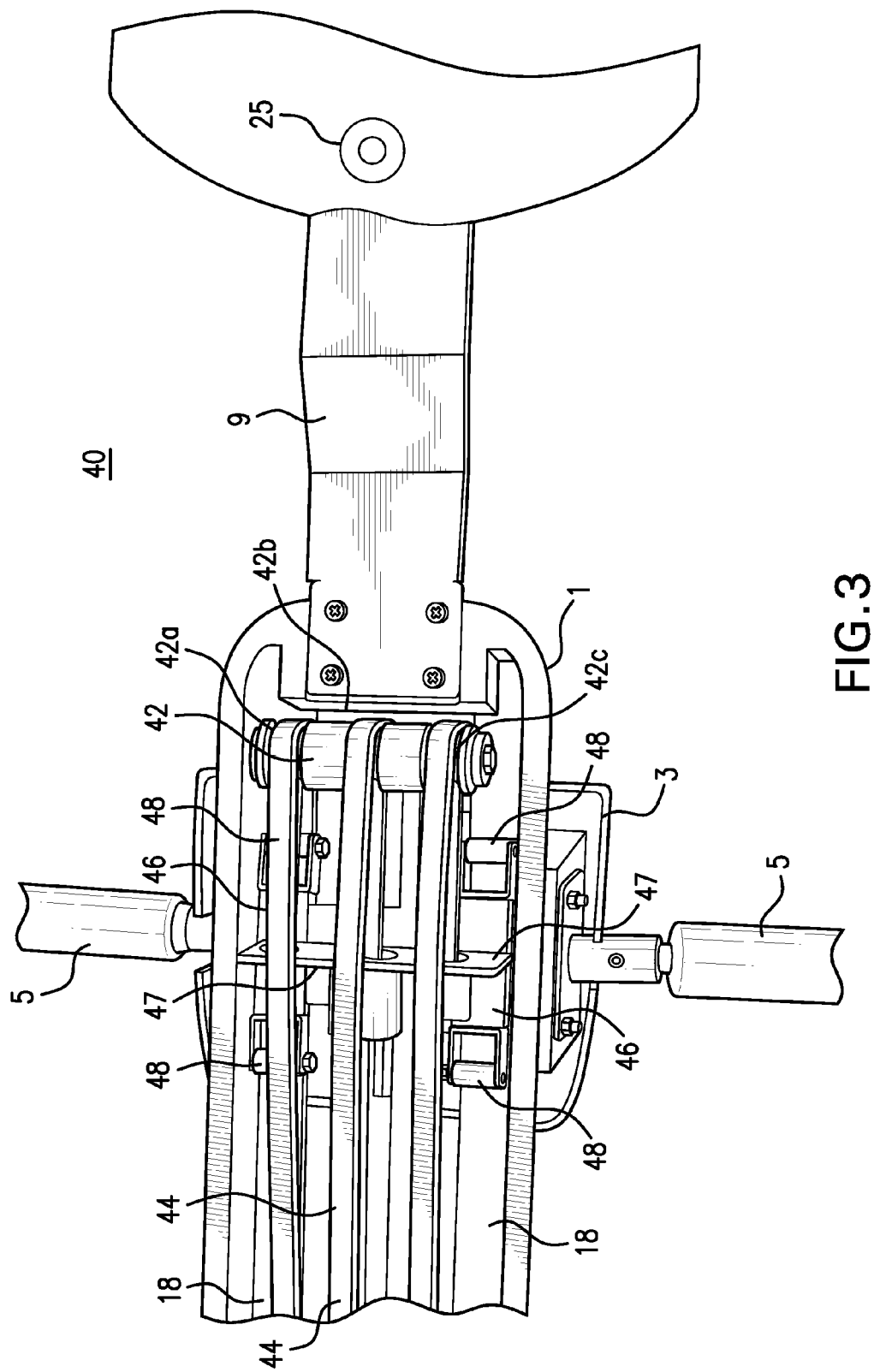
FIG. 3 is a partial bottom view of the embodiment of FIG. 1.

The underside of proximal end 2 of track 1, console 3, beam 9 and stationary base 7 is shown in FIG. 3. Pulley 42 is mounted in proximal end 2 of track 1 and serves as a support or roller bearing for one or more elastic resistance elements 44 which wrap around pulley 42. Pulley 42 includes grooves 42a, 42b and 42c which prevent elastic resistance elements 44 from sliding laterally along pulley 42. Elastic resistance elements 44 each have one end affixed to an anchor point on a console anchor such as anchor plate 47 on undercarriage 46 of console 3. The opposite ends of elastic resistance elements 44 are fixedly anchored to distal end 4 of track 1, in a manner described below. Undercarriage 46 of console 3 is fixedly attached to console 3 in order to facilitate the sliding of console 3 along track 1. As used herein, the term "sliding" shall encompass "rolling" so that console 3 may "slide" along track 1 even if console 3 travels along track 1 on wheels or rollers. For example, undercarriage 46 includes friction mitigation units such as rollers 48, though the friction mitigation units could also be low-friction pads or the like. Undercarriage 46 of console 3 slides along flange 18 of track 1.

Track 1 is rigidly connected to hub 25 of stationary base 7 by beam 9. It is to be understood that the term "rigidly connected" means that track 1 is constrained from displacing laterally relative to hub 25 of stationary base 2 even though track 1 and beam 9 are free to rotate about hub 25, which defines the center of any arcs defined by rotation of track 1. Hub 25 includes a bearing to facilitate rotation of hub 25 and track 1. Thus, a user supported by support surface 21 of stationary base 7 and hand support members 5 of console 3 can rotate track 1 about hub 25 by applying lateral forces to track 1 through console 3.

Figure 4:
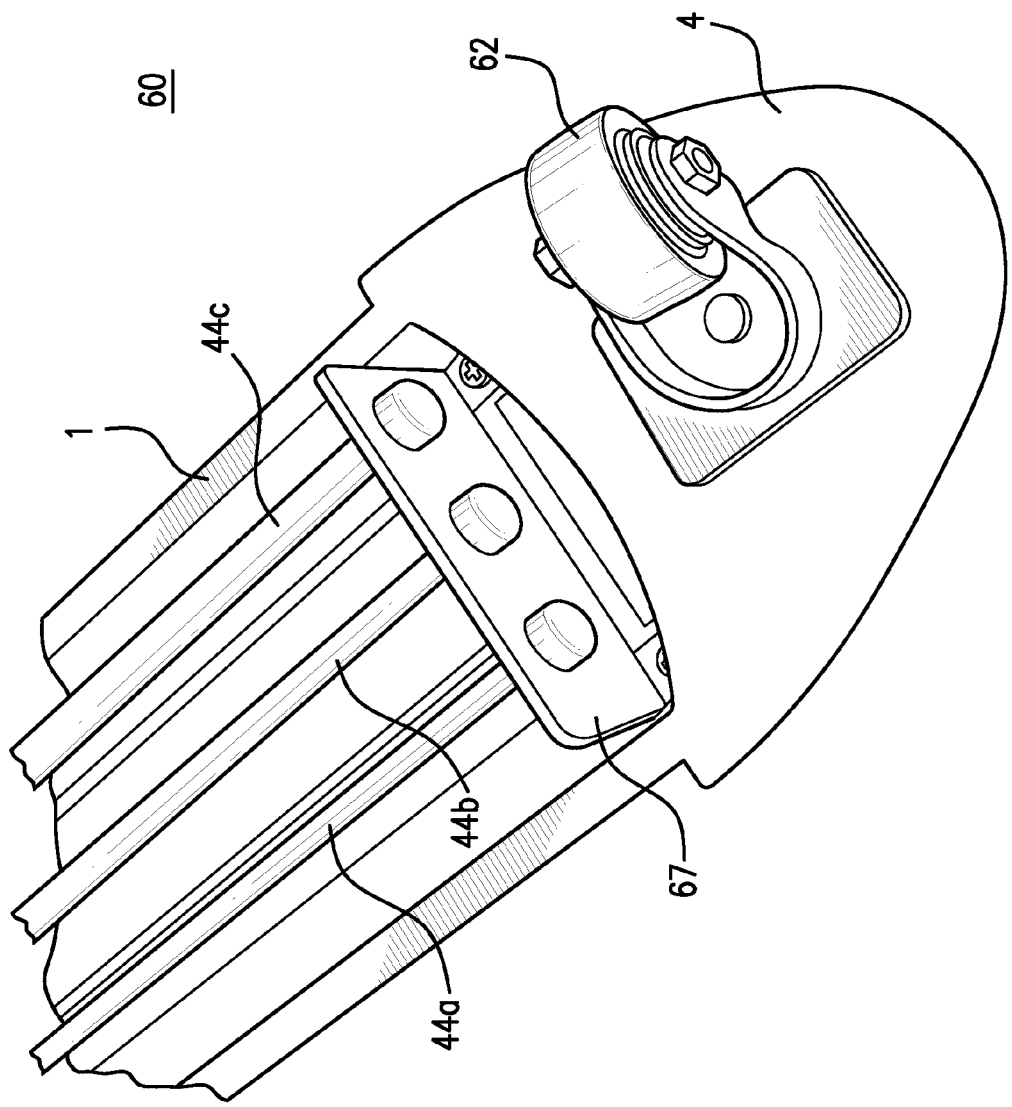
FIG. 4 is a partial bottom view of the distal end of the track portion of the embodiment of FIG. 1.

The underside of distal end 4 of track 1 is shown in FIG. 4. As mentioned above, the opposite ends of elastic resistance elements 44 are anchored to distal end 4 of track 1 at an anchor point on a track anchor such as anchor plate 67. Thus, elastic resistance elements 44 are affixed at opposite ends to anchor plate 47 of console 3 and to anchor plate 67 of track 1, with an interior portion of elastic resistance elements 44 rollably supported by pulley 42. It can thus be seen that movement of console 3 away from proximal end 2 of track 1 and toward distal end 4 causes elastic resistance elements 44 to stretch in length. The force required to stretch elastic resistance elements 44 is provided by the user of abdominal training device 1 by resting upon support surface 21 and hand support members 5 and using the core muscles to push console 3 toward distal end 4 of track 1. Distal end 4 of track 1 also includes a friction mitigation unit such as wheel 62. The friction mitigation unit is provided to facilitate rotation of track 1 about hub 25 and may also be a roller ball or low-friction pad.

Figure 5:
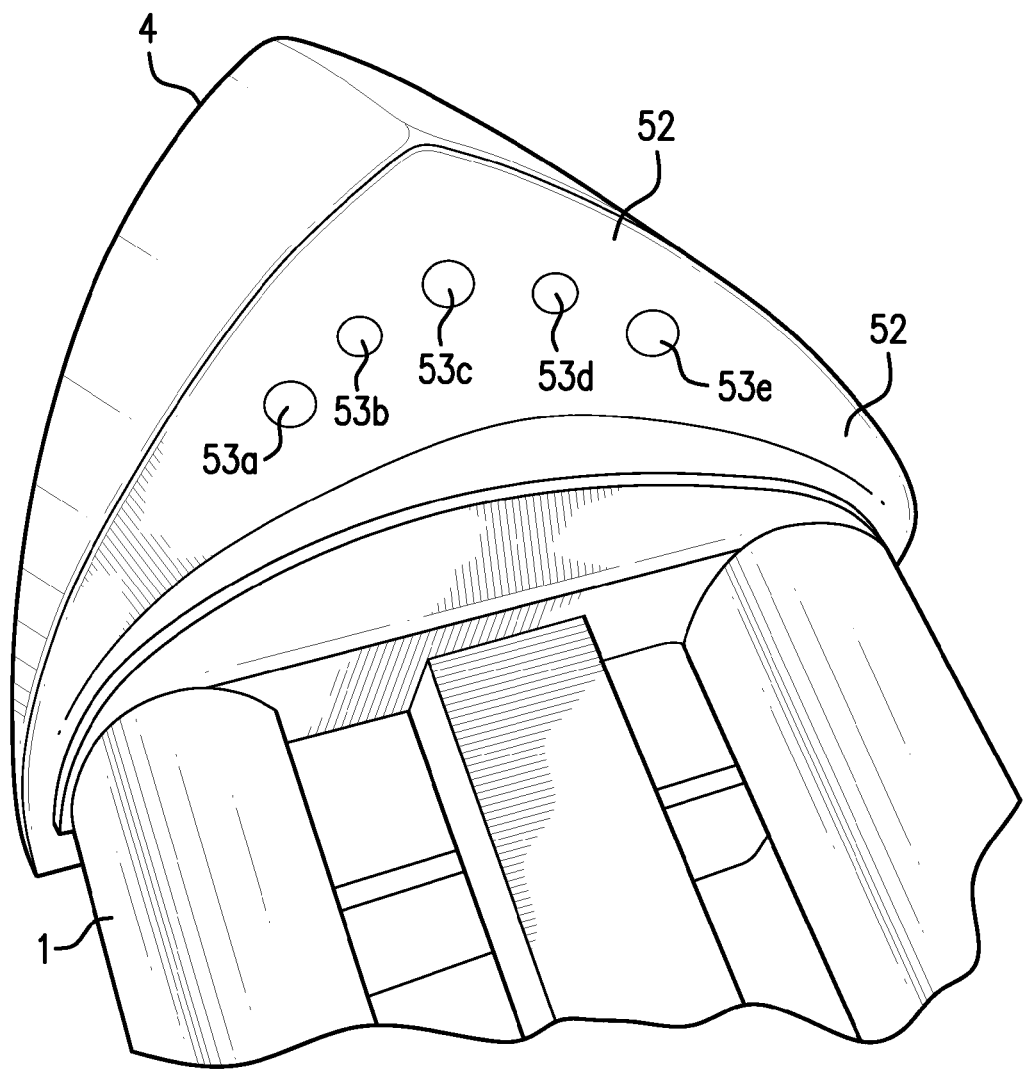
FIG. 5 is a partial top view of the distal end of the track portion of the embodiment of FIG. 1.
Figure 7:
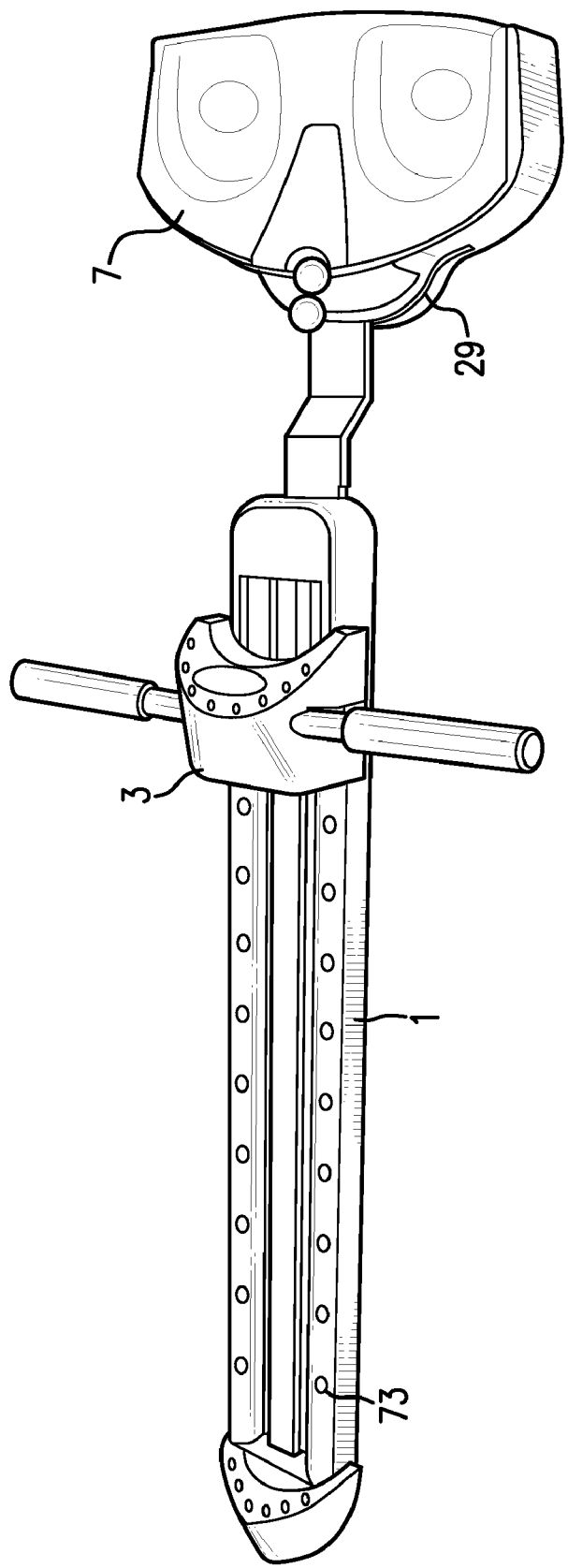
FIG. 7 is a perspective view of an alternative embodiment of an abdominal training device.

The topside of distal end 4 of track 1 is shown in FIG. 5 and includes notification panel 52. A plurality of indicators such as lights 53 are provided on panel 52 so as to be visible to a user supported by support surface 21 and hand support members 5. Similarly, indicators such as lights 33 may be provided on console 3. Finally, as shown in FIG. 7, abdominal training device 10 may also include a plurality of indicators such as lights 73 along the upper surface of track 1. The purpose of lights 53 on panel 52, lights 33 on console 3, and lights 73 on track 1 will be explained below. Notification panel 52 may be removable from track 1. For example, some versions abdominal training device 10 may initially lack notification panel 52 but a user has the ability to install notification panel 52 as desired.

Figure 6:
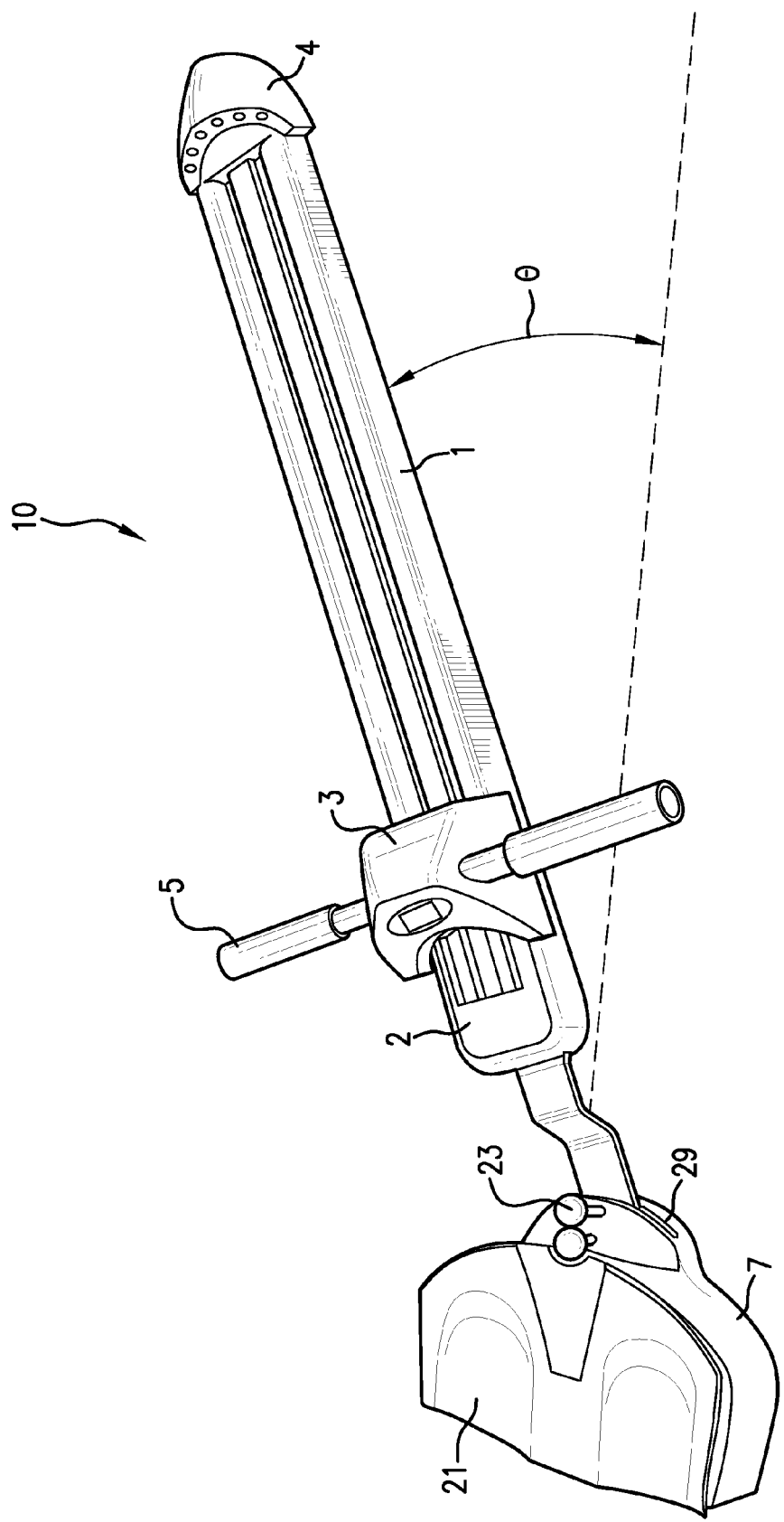
FIG. 6 is a top plan view of the embodiment of FIG. 1, illustrating angular displacement of the track relative to a starting position.

As shown in FIG. 6, track 1 is free to rotate about hub 25 of stationary base 7 when locking mechanism 23 is disengaged. A user of abdominal training device 10 places his knees on support surface 21 of stationary base 7 and his hands on hand support members 5 of console 3. To begin the exercise, the user pushes console 3 forward using core muscles. As console 3 is supported on track 1 by wheels, rollers, or low friction pads, the force applied by the user causes console 3 to slide toward distal end 4 of track 1. This movement of console 3 toward distal end 4 of track 1 causes elastic resistance elements 44 to lengthen. Thus, the user must provide sufficient force to fully stretch elastic resistance elements 44 in order to move console 3 the entire length of the track. The user then pulls back on console 3 and moves back to the starting position with console 3 near proximal end 2 of track 1.

In addition to the motion of console 3 along track 1 described above, the user may also move track 1 from side to side by rotating it about hub 25 of stationary base 7, as shown in FIG. 6. The user can rotate track 1 either before or during the motion of console 3 along track 1. The total available range of motion of track 1 is not critical and can be as high as 360 degrees. However, in the illustrated embodiment, the range of motion of track 1 is approximately 90 degrees (45 degrees both clockwise and counterclockwise from the starting position). Further, the user is free to rotate track 1 less than the total available range of motion (for example, only 15 degrees) in order to add even more variety to the motion of the exercise.

Figure 8:
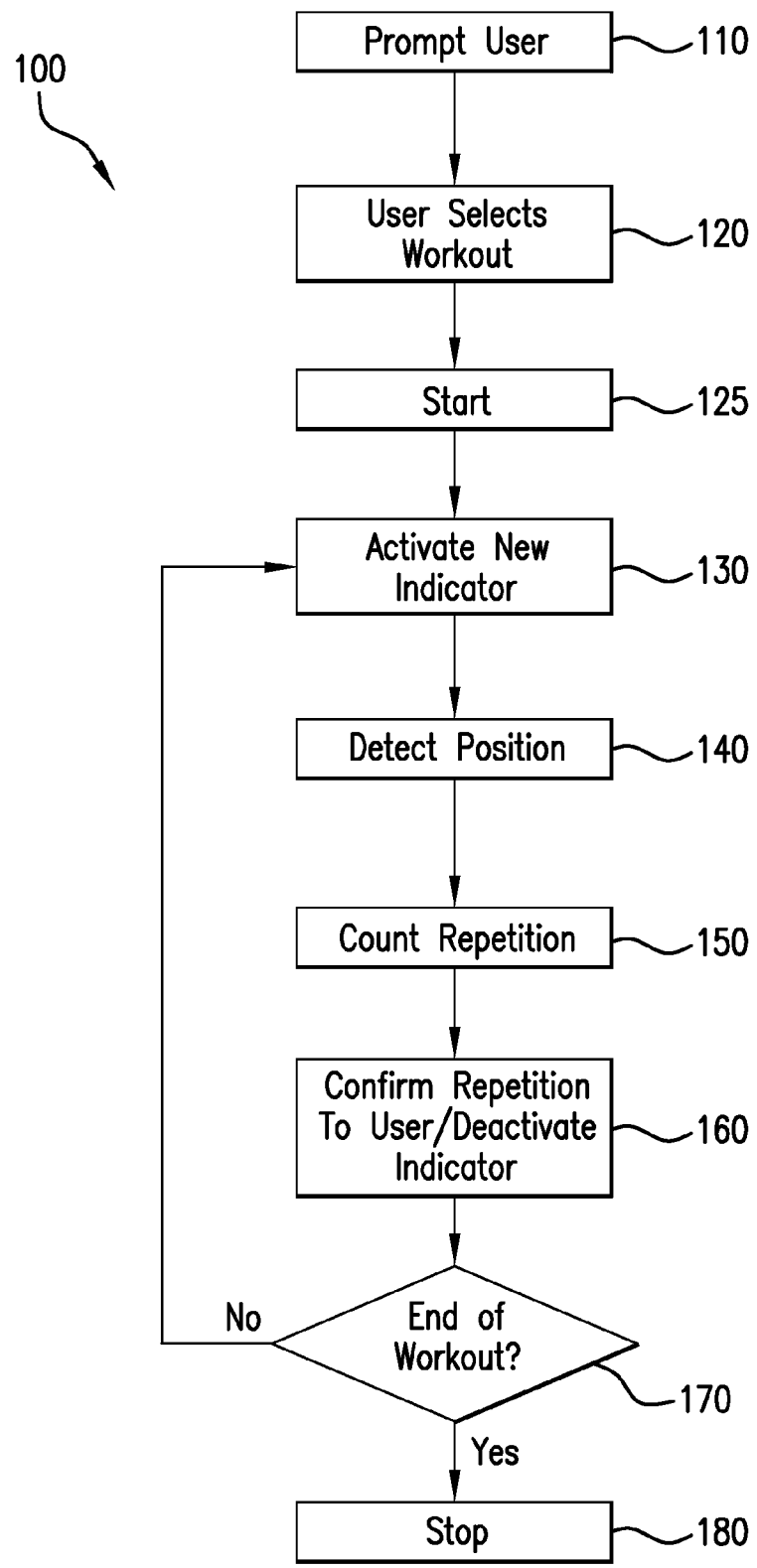
FIG. 8 is a flow chart detailing operation of a training program optionally included in some embodiments of an abdominal training device.

Abdominal training device 10 may also included embedded software, such as training program 100 shown in FIG. 8, stored in non-transitory and tangible computer readable media connected to a processor in console 3. After training program 100 is started by the user, it prompts the user to select a workout (110). This prompt may appear on a display such as display 32 on user interface 31 of console 3. The user then selects a workout (120) using buttons 37 on user interface 31. The program then starts (125) and activates an indicator (130) directing the user to move console 3 and/or track 1 to an indicated position. In this embodiment, the indicators activated by training program 100 are lights or LED's such as lights 33 on console 3, lights 53 on distal end 4 of track 1 and/or lights 73 along the length of track 1. For example, illumination of light 53a or 33a signifies that the user must rotate track 1 counterclockwise approximately 45 degrees. Similarly, illumination of lights 73 along track 1 indicates to the user how far to move console 3 (to add variety to the exercise routines, the user is not necessarily required to move console 3 all the way to distal end 4 of track 1).

Once the user is notified of the position to which track 1 and/or console 3 must be moved, the user begins performing the required repetition. Abdominal training device 10 then detects when the track 1 and/or console 3 has been moved to the required position (140). This detection may be accomplished by any conventional method, such as embedding magnetic sensors along track 1 that are triggered when console 3 passes by, or embedding magnetic sensors in slit 29 of stationary base 7 that are triggered when beam 9 rotates past. Alternatively, detection of the angle of track 1 relative to the starting position may accomplished by connecting beam 9 to a rheostat inside stationary base 7 so that the electrical resistance in a circuit varies as beam 9 rotates. By measuring the change in resistance, the position of track 1 can be determined.

When training program 100 detects that the user has performed the required movement, it counts one repetition (150) and displays the total number of repetitions performed on display 32. Abdominal training device 10 then confirms to the user that the repetition was successfully performed (160) by deactivating the indicator (for example, light 53a or light 33a) or by emitting a sound such as a beep from sound generator 34 on user interface 31 of console 3. Training program 100 then determines if the workout is over (170). If the repetition count exceeds a predetermined value (i.e., the most recent repetition was the last repetition of the workout selected by the user), the program ends (180). If more repetitions remain, training program 100 returns to step (130) and activates a new indicator requiring the user to move track 1 and/or console 3 to a new position.

Although in this embodiment of abdominal training device 10 the position of track 1 and/or console 3 is detected using sensors, it is to be understood that in other embodiments no sensors are required. For example, once an indicator is activated directing the user to move track 1 and/or console 3 to a specific position, training program 100 may simply give the user a fixed amount of time such as 5 seconds to perform the repetition before activating the next indicator.

Figure 9:
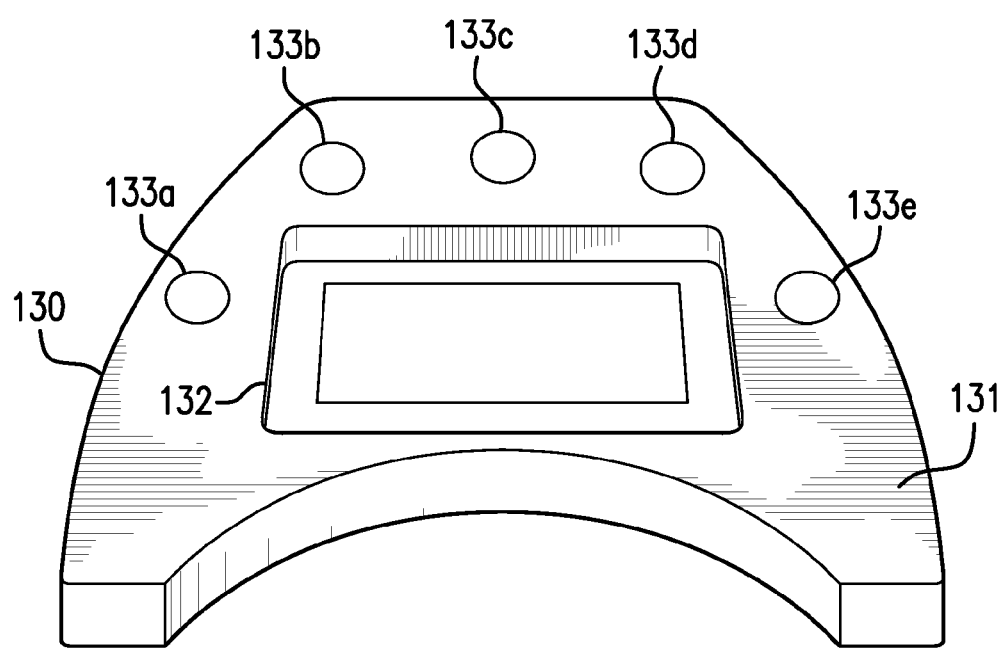
FIG. 9 is a front elevation view of an alternative console for use with the embodiment of FIG. 1.

In another alternative embodiment of abdominal training device 10, the user interface may be a handheld computer such as a smartphone or digital music player. For example, as shown in FIG. 9, console 130 includes computer dock 132. Computer dock 132 may include one or more universal serial bus (USB) ports or one or more ports designed for specific popular handheld devices. In this embodiment, the handheld computer in dock 132 is smartphone 137. Training program 100 is stored in non-transitory and tangible computer readable media on smartphone 137. Thus, smartphone 137 can be used to control and customize the workouts that abdominal training device 10 directs the user to perform.

By incorporating a handheld computer such as smartphone 137 into abdominal training device 10, it is possible to provide richer user interactivity. Smartphone 137 may simply be used to run training program 100 and activate/deactivate lights 133a-133e, 53a-53e and 73, but the relatively powerful processors in modern smartphones allows for much more complicated software. For example, a video game that responds to user movements of abdominal training device 10 may be stored on smartphone 137. Furthermore, smartphone 137 may include an accelerometer that measures movement of console 133 and track 1. Smartphone 137 may use data from the accelerometer, instead of sensors built into abdominal training device 10, to determine whether the user has performed movements as required by training program 100. Finally, smartphone 137 may communicate with another computer or video game console wirelessly. If so, a computer monitor or television screen can be used to display a video game that responds to movements of abdominal training device 10. As desktop computers and video game consoles can have much more powerful processors than are found in handheld computers, the interactive user experience may be even richer.

Figure 10:
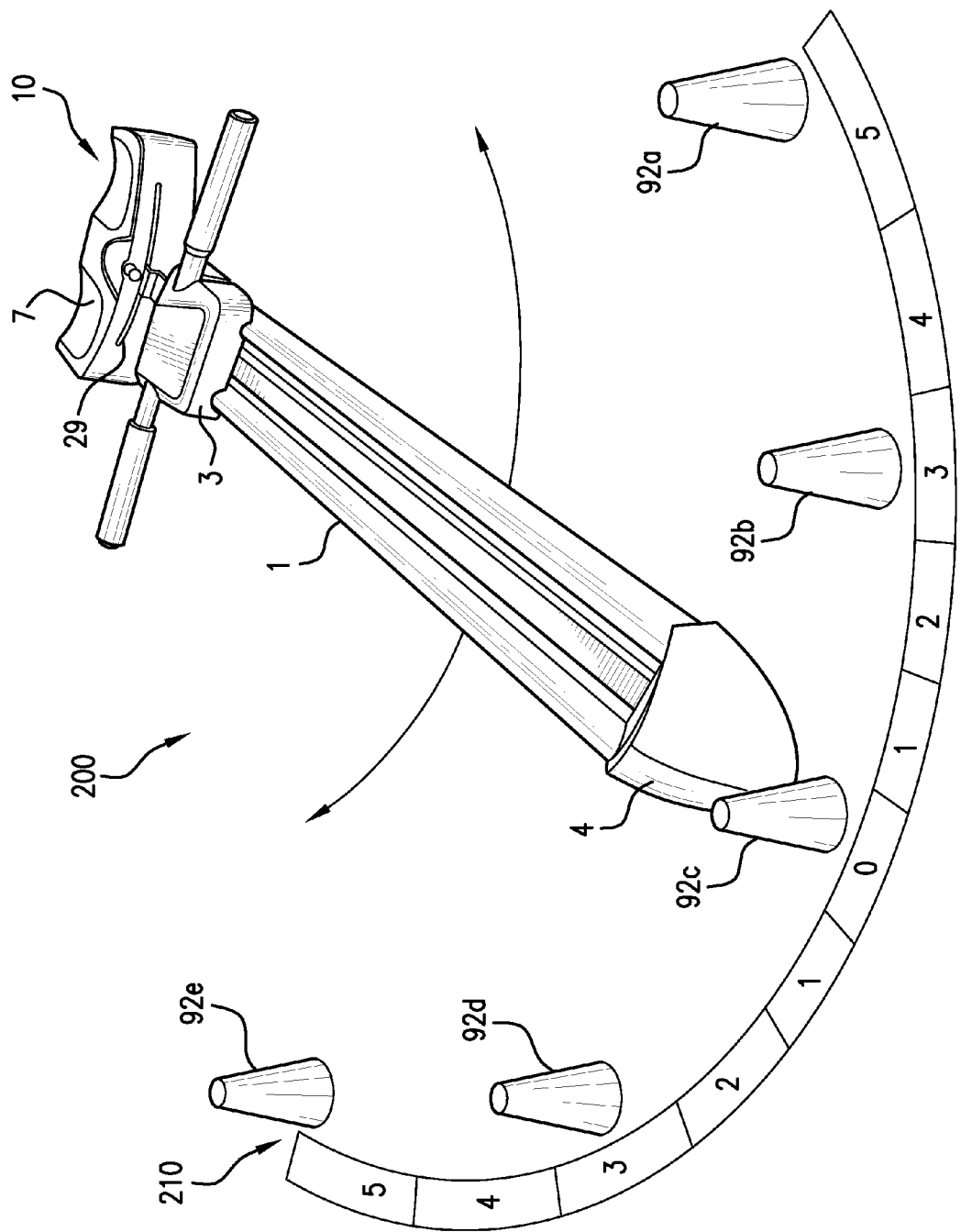
FIG. 10 is a perspective view of one embodiment of an abdominal training kit including an abdominal training device and a rotation measurement device.

An abdominal training kit 200 including abdominal training device 10 and rotation measurement device 210 is shown in FIG. 10. Rotation measurement device 210 is used as an alternative to, or in addition to, training program 100 and indicator lights 33 and 53. In this embodiment, rotation measurement device 210 includes a plurality of cones 92 and arcuate mat 94 which is provided with indicia corresponding to the rotation of track 1 relative to the starting position (shown as 0 on arcuate mat 94). The user can then use rotation measurement device 210 to help perform repetitions on abdominal training device 10 in various desired directions.

Figure 11:
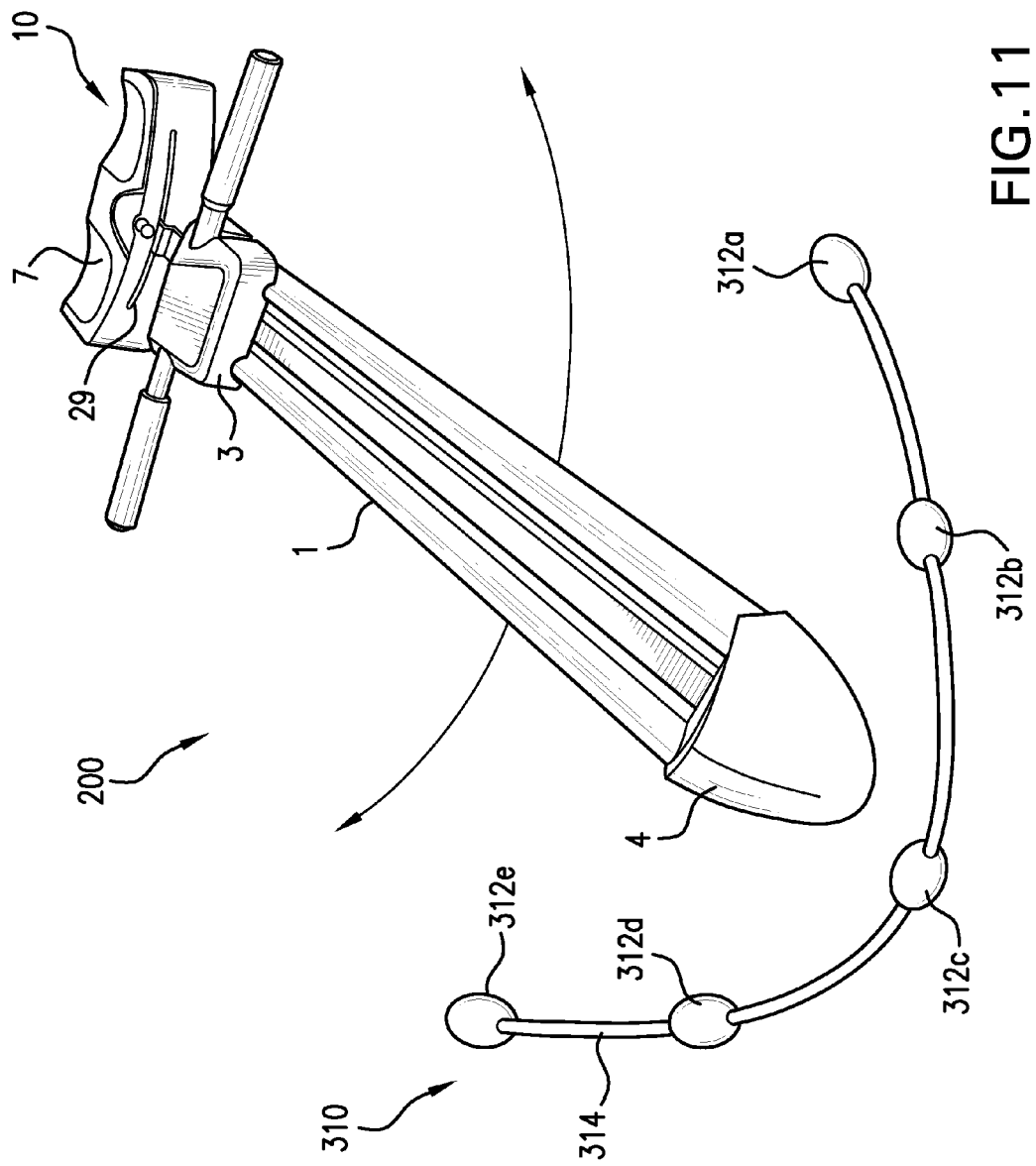
FIG. 11 is a perspective view of another embodiment of an abdominal training kit including an abdominal training device and a rotation measurement device.

FIG. 11 shows alternative abdominal training kit 200 with an alternative rotation measurement device 310. In this embodiment, rotation measurement device 310 includes a plurality of indicators 312 on an arcuate strand 314. Indicators 312 may be lights that illuminate and extinguish according to a predetermined pattern. The user can then rotate track 1 to align with each illuminated indicator 312 in order to perform a workout routine.

The materials used to construct abdominal training device 10 and abdominal training kit 200 are not critical. Most portions of track 1, console 3 and stationary base 7 may be made from a wide variety of plastics such as polypropylene, polystyrene, polyvinyl-chloride, etc. Some portions of track 1, console 3 and stationary base 7 may be made from metals for increased durability and strength. For example, undercarriage 46 of console 3 may be partially made from metal to withstand the weight of the user. Similarly, beam 9 may be made of metal to withstand stresses caused by the user performing exercises.

Figure 12:
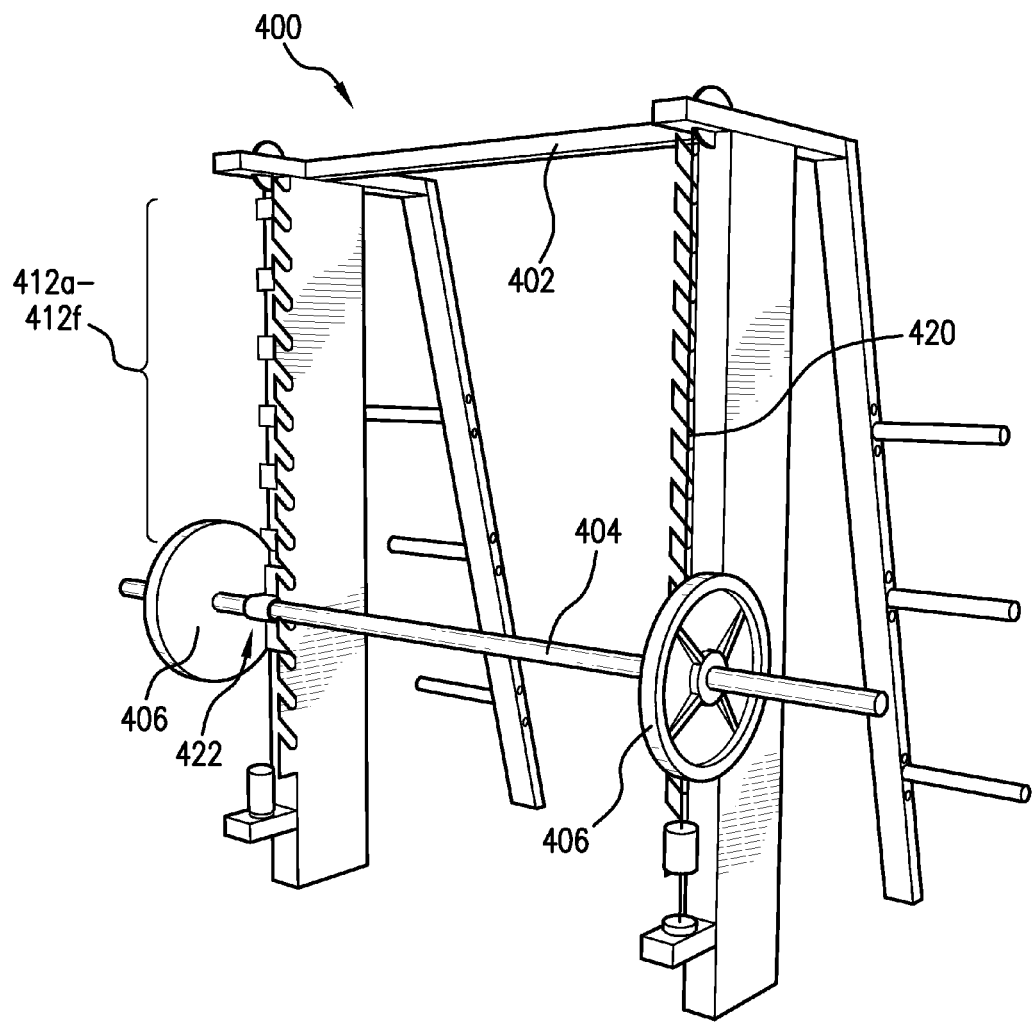
FIG. 12 is a perspective view of one embodiment of an interactive exercise device.
Figure 13:
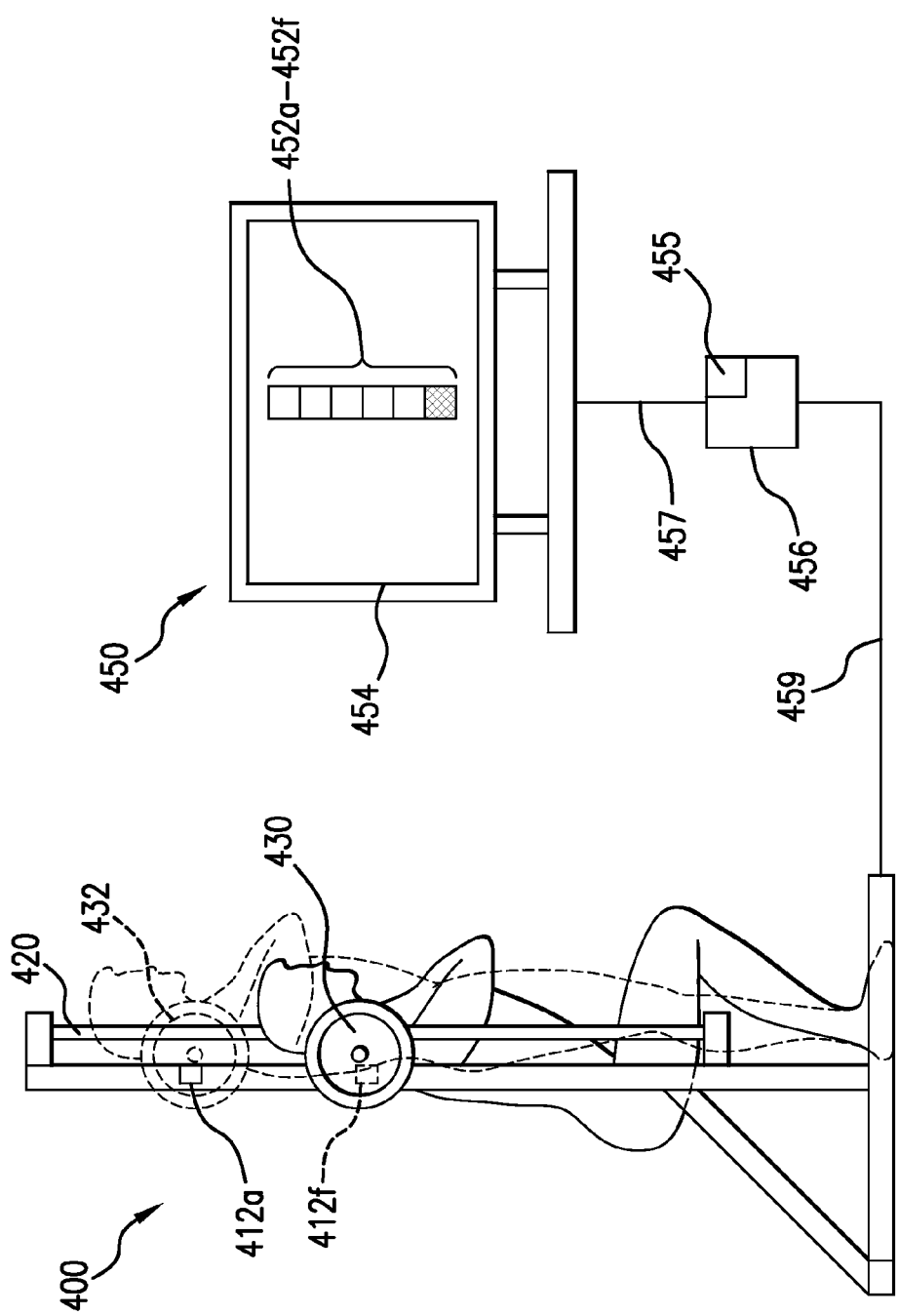
FIG. 13 is a schematic view of the interactive exercise device of FIG. 12, showing the device operably connected to an interactive motion guide.

Various embodiments of other interactive exercise devices are shown in FIGS. 12-16. For example FIGS. 12 and 13 show an interactive exercise device built on the concept of a Smith machine. Interactive exercise device 400 includes stationary base 402 to which first exercise implement 404 is movably connected. In this embodiment, first exercise implement 404 is a barbell slidably mounted to stationary base 402. The barbell is constrained to only vertical movement by one or more guide rails 420. If there is only one guide rail 420 (as shown in FIG. 12), first exercise implement 404 may include one or more sleeves 422 that slide along the single guide rail in order to ensure only vertical movement first exercise implement 404. If there are two guide rails 420 (as shown in FIG. 13), first exercise implement 404 may simply slide between the two guide rails.

In the embodiments of FIGS. 12 and 13, resistance to movement of first exercise implement 404 relative to stationary base 402 is provided by one or more resistance elements 406 attached to first exercise implement 404. For example, resistance elements 406 may be weights (as shown), or may also be elastic resistance elements such as rubber bands connected between first exercise implement 404 and stationary base such that resistance is provided by extending the rubber bands beyond their natural length. Alternatively, resistance may be provided by connecting a flywheel to first exercise implement 404 by a cable such that resistance is provided by overcoming the inertia (or damping) of the flywheel.

Interactive exercise device 400 also includes a plurality of position sensors 412a-412f (collectively referred to as position sensors 412). Position sensors 412 are part of interactive motion guide 450, which is a subsystem of interactive exercise device 400. Position sensors 412 may be an sensors capable of detecting a position of first exercise implement 404. For example, position sensors 412 may be magnetic switches that are tripped when first exercise implement 404 passes. Alternatively, position sensors 412 may be infrared sensors that are tripped when an infrared beam is blocked as first exercise implement 404 passes.

Position sensors 412 are situated on stationary base 402 in locations that correspond to various positions of first exercise implement 404 relative to stationary base 402. For example, as shown in FIG. 13, position sensor 412a corresponds to first position 432 of first exercise implement 404. Similarly, position sensor 412f corresponds to second position 430 of first exercise implement 404. Each position sensor 412a-412f corresponds to a position of first exercise implement 404 relative to stationary base 402, though for the sake of clarity only first position 432 and second position 430 are depicted in the drawings.

Position sensors 412 are operably connected to processor 456 of interactive motion guide 450. This connection 459 (shown schematically in FIG. 13) may be physical or wireless. Processor 456 is operably connected to computer readable medium 455. Computer readable medium 455 may be embedded on processor 456, or the two may be connected by any suitable communication link. Processor 456 may be a stand-alone unit expressly dedicated for use with interactive exercise device 400. However, in some embodiments, processor 456 may be part of a general purpose computer, a video game system, a tablet computer, a digital music player or a smartphone. Processor 456 is operably connected to display screen 454 via connection 457, which may be a wired or wireless connection.

Display screen 454 (which may be a television screen, computer screen, smartphone screen or dedicated output device such as a LCD or LED readout) includes a plurality of electronic indicators 452a-452f (collectively referred to as electronic indicators 452). Each electronic indicator 452 corresponds to a position sensor 412 and therefore also corresponds to a position of first exercise implement 404 relative to stationary base 402. For example, electronic indicator 452a corresponds to position sensor 412a and first position 432 of first exercise implement 404. Similarly, electronic indicator 452f corresponds to position sensor 412f and second position 430 of first exercise implement 404.

As the user performs exercises and first exercise implement 404 passes the various position sensors 412, processor 456 detects the change in output of position sensors 412 as each sensor is tripped by the passage of first exercise implement 404. Instructions stored on computer readable medium 455 of processor 456 determine the resulting output of electronic indicators 452. For example, when the user begins an exercise routine, the instructions may require all electronic indicators 452 to initially be extinguished. Then the instructions may require one of the electronic indicators, such as electronic indicator 452a, to be illuminated. Processor 456 reads these instructions and directs display screen 454 to illuminate electronic indicator 452a. When the user sees the illumination of electronic indicator 452a, the user knows he must move first exercise implement 404 to first position 432.

Once the user has successfully performed the movement of first exercise implement 404 to first position 432, position sensor 412a will be tripped. Processor 456 detects that position sensor 412a has been tripped and reads instructions from computer readable medium 455 to extinguish electronic indicator 452a and illuminate another electronic indicator 452, for example electronic indicator 452f. The user will now realize that he must move first exercise implement 404 to second position 430. Once the user successfully moves first exercise implement 404 to second position 430, electronic indicator 452f will be extinguished and another electronic indicator 452 illuminated. This process repeats itself until the entire workout routine stored in computer readable medium 455 has been performed.

The workout routine described above is interactive in the sense that the user is given instructions by processor 456 and must respond to illumination/extinguishing of electronic indicators 452 by moving first exercise implement as directed. However, the instructions stored in computer readable medium 455 may also allow the user to choose his own workout and simply use display screen 454 to gauge workout progress. For example, processor 456 may illuminate each electronic indicator 452 as the user moves first exercise implement 404 past each respective position sensor 412. In this way, the user can see visually how far along the possible range of motion first exercise implement 404 is relative to stationary base 402.

Figure 14:
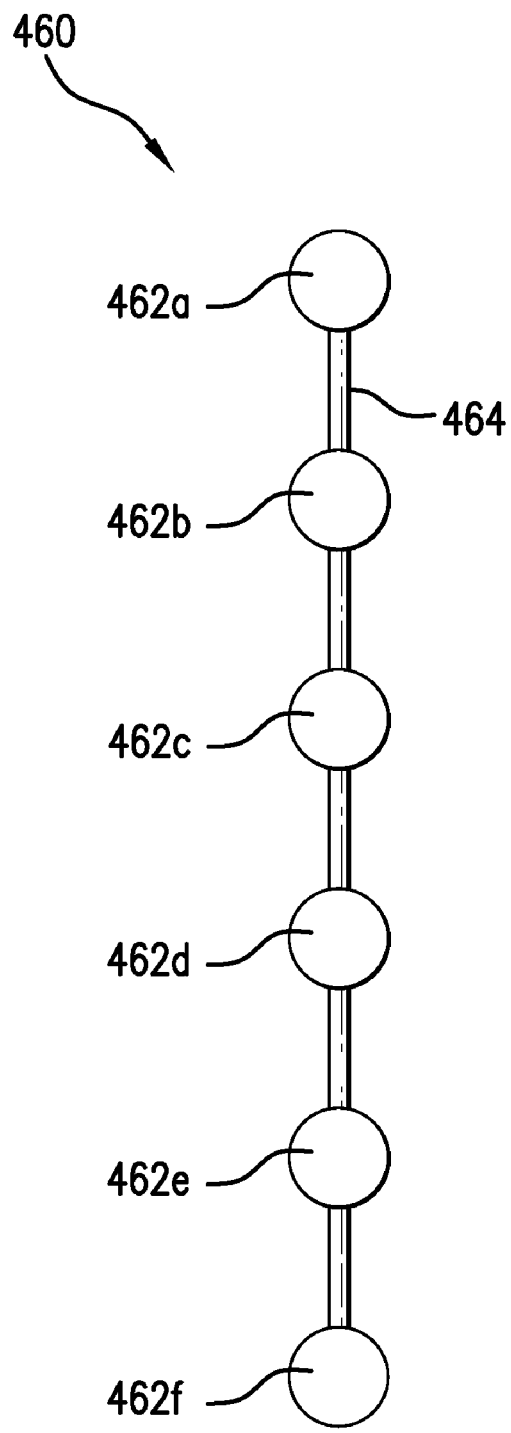
FIG. 14 is a front view of an alternative embodiment of an interactive motion guide.

FIG. 14 shows an alternative display device for interactive motion guide 450. In this embodiment, display device 460 includes a plurality of electronic indicators 462a-462f connected by strand 464. Display device 460 may be used as an alternative to, or in addition to, display screen 454 described above. Display device 460 functions in the same way as described above with respect to display screen 454. For example, display device 460 is operably connected to processor 456 just as display screen 454 is operably connected to processor 456. Similarly, processor 456 directs one or more of electronic indicators 462 to illuminate and/or extinguish based the position of first exercise implement 404 relative to stationary base 402 as detected by position sensors 412. Display device 460 has the advantage of optionally being relatively small and portable. Also, display device 460 may be place on the floor, hung on the wall, and may be flexible so as to provide a curved configuration for electronic indicators 462.

Other embodiments of interactive exercise devices will now be described with reference to FIGS. 15 and 16. In the following discussion, it is to be understood that these interactive exercise devices also include as a subsystem interactive motion guide 450 as described above with respect to the previous embodiments. Although not shown in FIGS. 15 and 16, it is to be understood that interactive motion guide 450 is operably connected to the embodiments described below, for example through a wired or wireless communications link.

Figure 15:
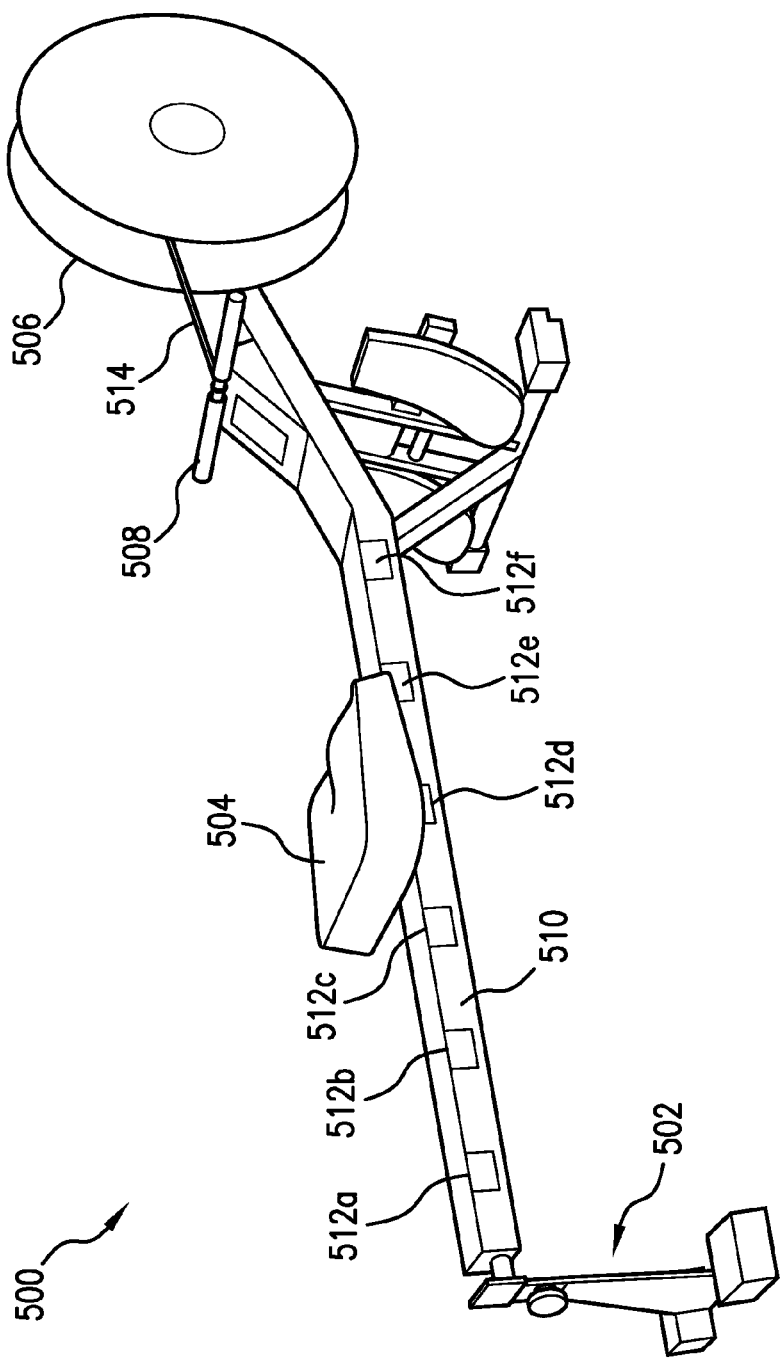
FIG. 15 is a perspective view of another embodiment of an interactive exercise device.

FIG. 15 shows an interactive exercise device based on the concept of a rowing machine. Interactive exercise device 500 includes stationary base 502 to which first exercise implement 504 is slidably connected. In this embodiment, first exercise implement 504 is a seat mounted on a trolley which slides along track 510 of stationary base 502. Embedded along track 510 are a plurality of position sensors 512a-512f which detect the position of first exercise implement 504 along track 510. Processor 456 determines the position of first exercise implement 504 along track 510 based on the changing output of position sensors 512 and then, based on the instructions stored in computer readable medium 455, causes electronic indicators 452 to illuminate or extinguish. The user responds to this changing feedback provided by electronic indicators 452 in the same manner as described above with respect to the previous embodiments, namely by performing rowing motions to move first exercise implement 504 relative to stationary base 502.

In this embodiment, second exercise implement 508 is also provided. Second exercise implement 508 is a handlebar connected to flywheel 506 by cable 514. As flywheel 506 may provide significant resistance to the rowing motions performed by the user, flywheel 506 makes the exercise much more challenging. However, it is to be understood that flywheel 506 may be disengaged from second exercise implement 508 so that the majority of the resistance to motion of first exercise implement 504 relative to stationary base 502 is provided by the user's bodyweight.

Additionally, processor 456 may measure the position of second exercise implement 508 directly or indirectly. To measure the position directly, a sensor is embedded in flywheel 506 which counts rotations of flywheel 506 to determine the length of cable 514 that the user has pulled out of flywheel 506 during the rowing motion. To measure the position of second exercise implement 508 indirectly, processor 456 may simply measure the distance first exercise implement 504 has traveled along track 510, in the manner described above. Since the user cannot move first exercise implement 504 without also pulling on second exercise implement 508 (assuming the user is performing a rowing motion), the travel distance of first exercise implement 504 is roughly proportional to the travel distance of second exercise implement 508. Based on the number of rotations of flywheel 506, or the distance traveled by first exercise implement 504, processor 456 determines how far second exercise implement 508 has moved and then directs electronic indicators 452 to illuminate or extinguish accordingly.

Figure 16:
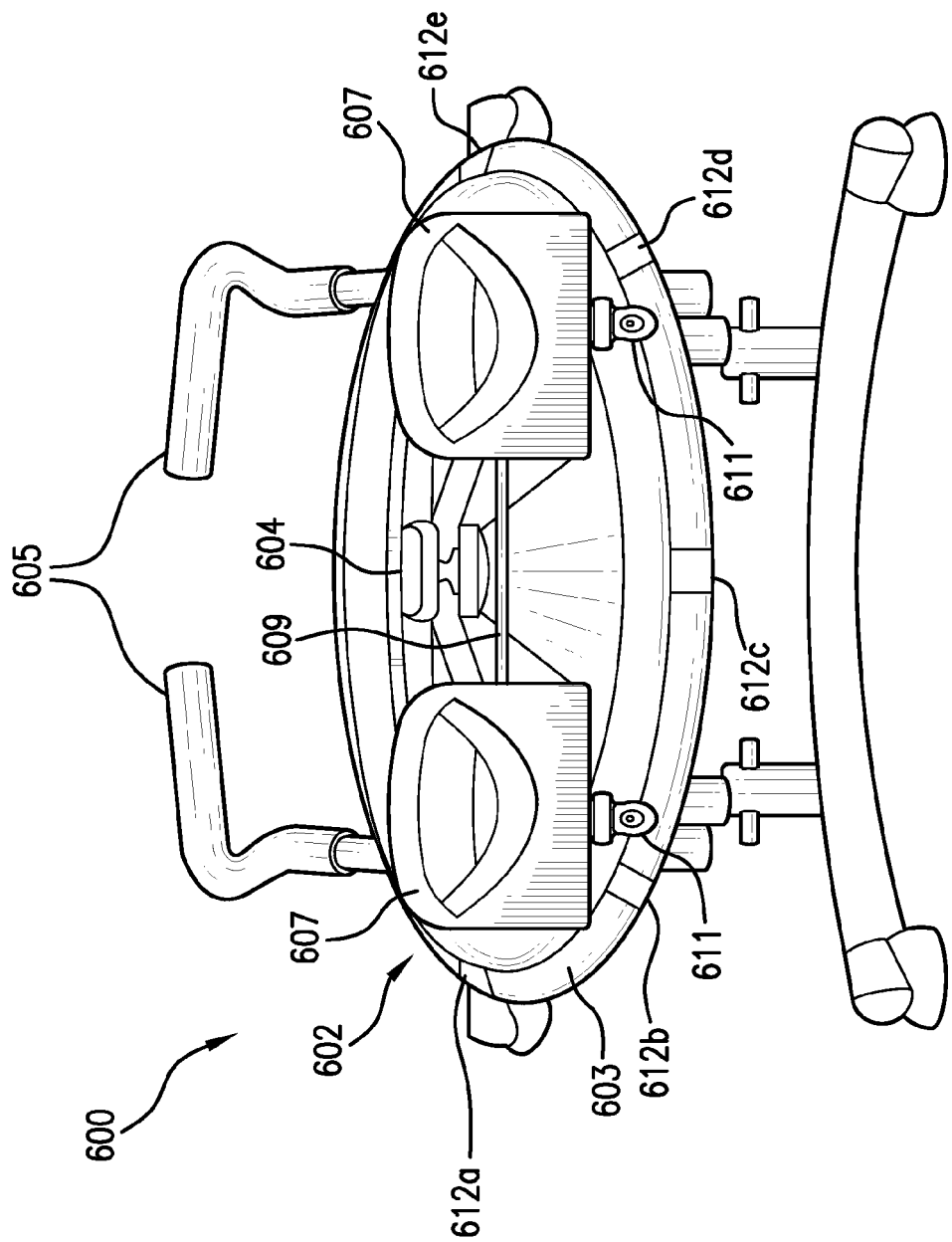
FIG. 16 is a perspective view of still another embodiment of an interactive exercise device.
Figure 17:
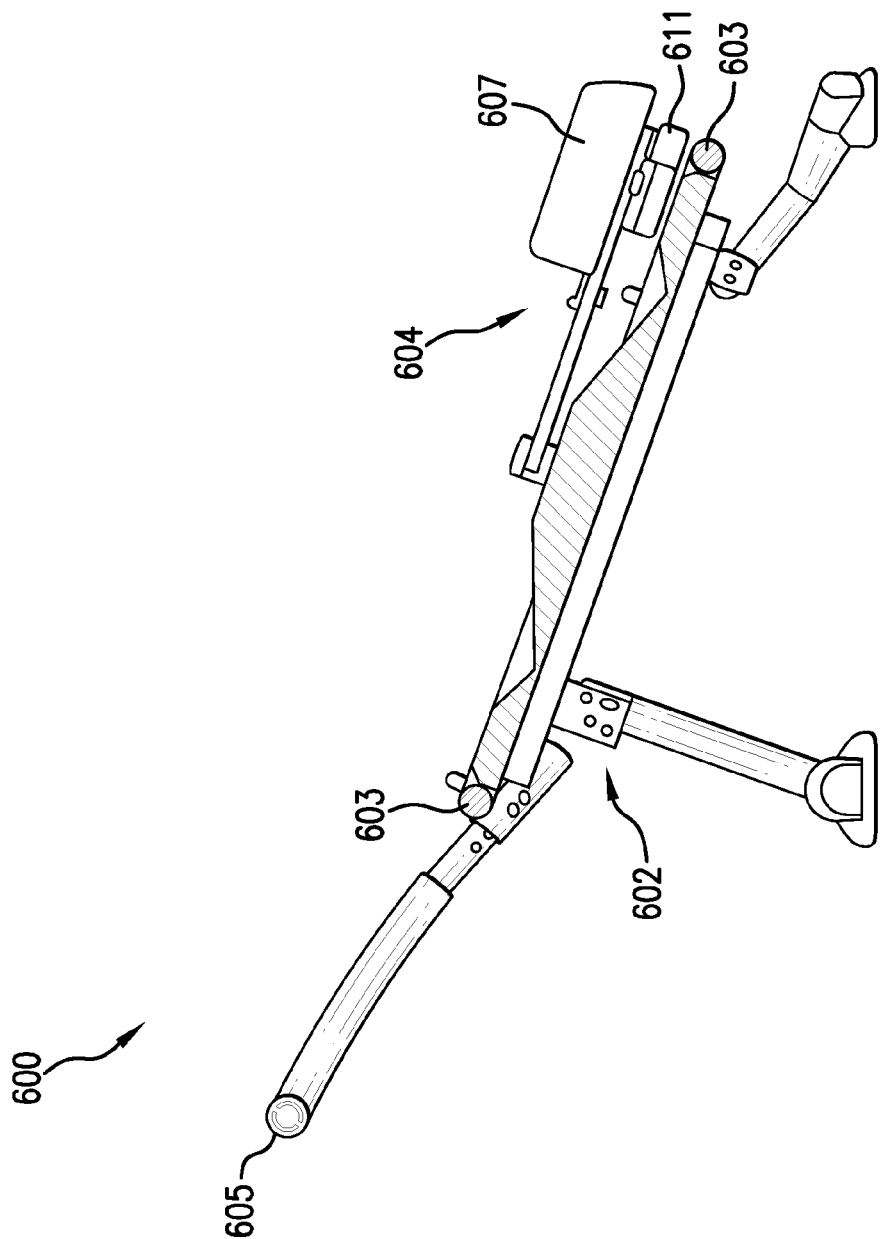
FIG. 17 is a cross-sectional profile view of the interactive exercise device of FIG. 16.

FIGS. 16 and 17 show an interactive exercise device based on the concept of a reciprocating abdominal exerciser. Interactive exercise device 600 includes stationary base 602 and first exercise implement 604. In this embodiment, stationary base 602 includes arcuate track 603 and handlebars 605, while first exercise implement 604 is a user support surface such as two kneepads 607. Arcuate track 603 may be a full circle, as shown, or may also be a portion of a circle such as a semicircle. Also, as best shown in FIG. 17, arcuate track 603 may be inclined.

To the bottom of each kneepad 607 is mounted a roller or wheel such as roller 611. Each roller 611 is rollably engaged with arcuate track 603. Furthermore, the two kneepads 607 may be rigidly linked together by connector pin 609. When connector pin 609 is engaged with both kneepads 607, kneepads 607 are rigidly connected to one another and must move in unison. For example, when linked together kneepads 607 roll along track 603 on their rollers 611, thereby tracing out a reciprocating arcuate path. On the other hand, when connector pin 609 is not so engaged, kneepads 607 can move independently of one another. For example, when not linked together, kneepads 607 can move in opposite directions along arcuate track 603.

As explained above, each interactive exercise device discussed herein, including interactive exercise device 600, may be operably connected to an interactive motion guide such as interactive motion guide 450 disclosed with respect to the previous embodiments. This connection may be a wired or wireless connection, or any other suitable communication link. Thus, interactive exercise device 600 also includes position sensors 612a-612e (collectively referred to as position sensors 612) embedded in arcuate track 603 of stationary base 602. Position sensors 612 may be magnetic, infrared, or any other sensor that can detect the passage of first exercise implement 604 (in this embodiment, kneepads 607) along arcuate track 603. For example, where position sensors 612 are magnetic, rollers 611 or kneepads 607 may include small magnets or ferrous metal that trips each respective position sensor 612 as rollers 611 and kneepads 607 move past.

Each position sensor 612 is embedded in arcuate track 603 in a location that corresponds to a predetermined location of first exercise implement 604 relative to stationary base 602. For example, if first exercise implement 604 rotates clockwise until the left-hand kneepad 607 is over position sensor 612a, first exercise implement 604 is in a first position relative to stationary base 602. Similarly, if first exercise implement 604 rotates counterclockwise until the right-hand kneepad 607 is over position sensor 612e, first exercise implement 604 is in a second position relative to stationary base 602.

To use interactive exercise device 600, the user observes interactive motion guide 450 which includes display screen 454 (and/or display device 460). Processor 456 reads instructions from computer readable medium 455 and directs display screen 454 to illuminate an electronic indicator such as electronic indicator 462a. The user will realize he must then rotate first exercise implement 604 clockwise until left kneepad 607 has reached the first position, namely with left kneepad 607 over position sensor 612a. To do so, the user grasps handlebars 605 and places his knees in kneepads 607 and begins a rocking side-to-side motion. Resistance to motion of first exercise implement 604 is provided by the user's bodyweight and by friction between rollers 611 and arcuate track 603. Thus, as the user is resting upon kneepads 607 of first exercise implement 604, the user's bodyweight may be considered a resistance element that resists against motion of first exercise implement 604 relative to stationary base 602.

By using the abdominal muscles, the user causes first exercise implement 604 to travel further and further along arcuate track 603 until left kneepad 607 finally reaches first position sensor 612a. Processor 456 detects that position sensor 612a has been tripped and directs display screen 454 to extinguish electronic indicator 462a and illuminate another electronic indicator such as electronic indicator 462e. The user will then realize he must rotate first exercise implement 604 along arcuate track 603 until the second position is reached, namely with right kneepad 607 over position sensor 612e. This process repeats itself until the user completes the program stored in computer readable medium 655.

It is to be understood that in all of the embodiments of interactive exercise devices described above, the interactive motion guide may take a wide variety of forms. For example, the electronic indicators that are illuminated/extinguished may be more complex than simply colored lights or symbols. For example, the electronic indicators may be characters or elements in a video game. As various positions of the first exercise implement relative to the stationary base are achieved by the user, the processor directs the video game character or element to change or move on the display screen. Based on the rules of the particular video game, the user will then respond by moving the first exercise implement to another position relative to the stationary base. For example, the display screen may show a virtual representation of a trainer using the same exercise equipment as the user. The user's task is then to accomplish in real life the various motions performed by the virtual trainer. Using the position sensors, the processor can detect whether or not the user is succeeding in performing the virtual trainer's routine. The processor can then alter the difficulty of the virtual trainer's routine to match the fitness level of the user.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An interactive exercise device, comprising:
a stationary base;
a first exercise implement movably connected to the stationary base;
a first resistance element operably connected to the first exercise implement, the first resistance element having an elastic member having a first end connected to the first exercise implement and a second end connected to the stationary base to provide resistance against at least some movements of the first exercise implement relative to the stationary base; and
an interactive motion guide directing a user of the interactive exercise device to move the first exercise implement relative to the stationary base in an indicated manner, the interactive motion guide comprising:
first and second electronic indicators;
a processor operably connected to the first and second electronic indicators; and
a non-transitory and tangible computer readable medium operably connected to the processor, the computer readable medium comprising instructions to manipulate output of the first and second electronic indicators.

2. The interactive exercise device of claim 1, wherein the first and second electronic indicators are lights.

3. The interactive exercise device of claim 1, wherein the first and second electronic indicators are sound emitters.

4. The interactive exercise device of claim 1, wherein the interactive motion guide comprises a display screen, and wherein the first and second electronic indicators are indicia displayed on the display screen.

5. The interactive exercise device of claim 1, wherein the first resistance element is a weight operably connected to the first exercise implement.

6. The interactive exercise device of claim 5, wherein the weight is a user's bodyweight.

7. The interactive exercise device of claim 1, wherein the first exercise implement is movable between a first position and a second position, the interactive motion guide further comprising first and second position sensors operably connected to the processor that detect when the first exercise implement has reached the first and second positions respectively, wherein the processor changes the output of the first electronic indicator when the first position second detects that the first exercise implement has reached the first position, and wherein the processor changes the output of the second electronic indicator when the second position second detects that the first exercise implement has reached the second position.

8. The interactive exercise device of claim 7, wherein the stationary base comprises a track, the first exercise implement comprises a trolley slidable on the track, and wherein the first and second positions correspond to different first and second locations of the trolley along the track.

9. The interactive exercise device of claim 7, wherein the stationary base comprises substantially vertical rails, the first exercise implement comprises a barbell slidably mounted to the substantially vertical rails, and wherein the first and second positions correspond to first and second locations of the barbell along the substantially vertical rails.

10. The interactive exercise device of claim 7, wherein the stationary base comprises an arcuate track, the first exercise implement comprises a user support member rotatable on the arcuate track, and wherein the first and second positions correspond to first and second locations of the user support member along the arcuate track.

11. The interactive exercise device of claim 10, wherein the user support member comprises kneepads.

* * * * *